June 12, 1951 L. A. NIELSEN 2,556,702
FISH LURE
Filed March 4, 1950

INVENTOR.
LOUIS A. NIELSEN
BY
ATTORNEY

Patented June 12, 1951

2,556,702

UNITED STATES PATENT OFFICE 2,556,702

FISH LURE

Louis A. Nielsen, New York, N. Y.

Application March 4, 1950, Serial No. 147,619

3 Claims. (Cl. 43—42.06)

My invention relates to a lure in the shape of a small fish suitable for casting or trolling.

One object is to provide an attractive lure that can be made commercially in different forms and colors and that will really catch fish.

A special object is to provide a lure with a heavy head and a flexible interchangeable body containing a normally concealed hook or hooks.

The head has an anchor wire mounted in it for attachment of the leader at its front end and attachment of a hook or hooks at the rear end. The hook may be detachably secured to the anchor wire so as to permit attachment of any desired form or size of hook.

In its preferred form, the head has a water passage leading to a hollow pliable body from which the water is allowed to escape. This passage may have a helical groove which causes the water to swirl as it enters the body and thus vibrates the walls of the body. This groove may be formed in the wall of the passage or as a tubular guard which may be inserted into the passage.

A deflector may be inserted at the inner end of the passage horizontally or vertically so as to cause vertical or horizontal action as desired.

The accompanying drawing illustrates the preferred form of the invention.

Figure 1:
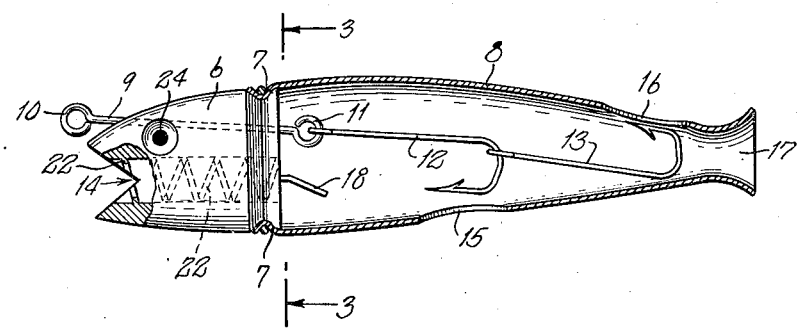
Fig. 1 is a side view and partial section of one form of the lure.

The head 6 may be formed of any suitable material such as lead and has a groove 7 at the rear into which the front end of the body 8 is suitably secured.

The body may be formed of various materials such as eel skin, rubber, silk or plastic such as "Pliofilm" or flexible "cellophane."

A wire anchor 9 is molded or cast in the head and has an eye 10 at its front end for attachment of a leader (not shown) and an eye 11 at its rear end for attachment of a hook 12. This hook may be of any suitable shape with one or more barbs. Preferably a second hook 13 of suitable design is hinged to hook 12.

The head 6 has a passage 14 through which water flows as the lure is moved in the water.

The body 6 has one or more discharge holes or openings such as 15, 16 and 17 from which the water flows.

The hooks are normally concealed but the barbs emerge through holes 15 and 16 when the fish bites the lure.

At the rear end of the passage 14, a deflector 18 is mounted. For instance, the head has a pair of grooves 19, 19 into which the shank of the deflector may be secured to deflect the water downwardly. By inserting the shank 20 into the grooves 21, 21, the deflector may be adjusted to cause lateral movement.

Figure 2:
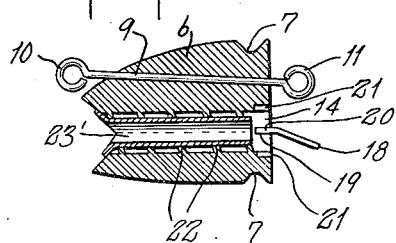
Fig. 2 is a longitudinal sectional view of the head with a guard inserted to prevent swirling of the water.
Figure 3:
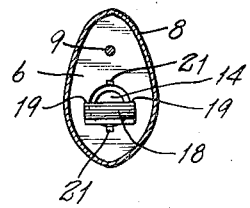
Fig. 3 is a cross sectional view taken on the plane of the line 3—3 of Fig. 1.
Figure 4:
Fig. 4 is a detail perspective view of the guard tube of Fig. 2.
Figure 5:
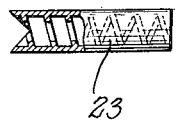
Fig. 5 is a detail view of a tube having internal grooves for insertion in a smooth water passage.

The inner wall of the passage 14 is preferably provided with helical grooves 22 so that the water will swirl as it passes through and cause a wiggling motion to the lure. These grooves may be formed in the wall of the passage as shown in Figs. 1 and 2, or in a tube 23 (Fig. 5) which is inserted into a smooth passage.

In case the passage has integrally formed grooves and this action is not desired, a smooth tube 23' may be inserted in the passage 14 so as to eliminate the effect of the grooves.

The head is preferably provided with eye sockets 24 painted or otherwise decorated and the body may be colored in any desired manner or even painted with luminous paint especially for use at night. In fact a number of different colored or shaped bodies may be provided for interchangeable use.

Figure 6:
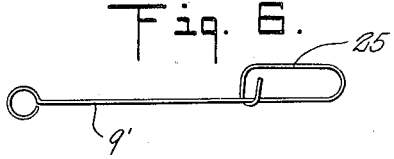
Fig. 6 is a detail view of an anchor latch.

In Fig. 6 I have shown a latch 25 which may be attached to or formed as a part of the anchor 9' so that the hook may be attached or detached as desired.

I claim:

1. A fish lure comprising a metallic head portion similar in shape to the head of a fish, an anchor member extending through the upper part of said head above its axial center having means at its front end for attachment of a line and at the rear end for attachment of a hook, said head having a single passage extending from front to rear below said anchor member, said passage having an open mouth at the front end thereof and an outlet at its rear end, a flexible hollow body detachably secured to the rear end of the head, a hook secured to the attaching means at the rear end of said anchor member and enclosed by said body, said body having an escape opening for the discharge of water which flows through the passage of the head and an angular deflector plate removably and adjustably secured in the rear end of said passage and disposed across the outlet in the path of movement of the water.

2. A fish lure, in simulation of a fish, comprising an elongated solid head section of heavy material forming a sinker, an elongated hollow body section of flexible material secured to the rear of said head section and forming a prolongation thereof, the front of said head section being shaped to form an open mouth, said head section having a straight passage below the axial center of the head section and leading from said mouth to and through the rear face of the head section, the rear outlet end of said passage having pairs of opposed vertical and horizontal grooves, a separate angular plate adapted to be removably mounted in one pair of grooves and to extend rearwardly into the body section and a hook member connected to the rear of the head section within the body section, said body section having an opening at its rear end for the escape of water.

3. A fish lure, in simulation of a fish, comprising an elongated solid head section of heavy material constituting a sinker, an elongated hollow body section of flexible material secured to the rear of said head section and forming a prolongation thereof, the front of said head section being shaped to form an open mouth, said head section having a straight passage below the axial center thereof and leading from said mouth to and through the rear surface of the head section, an angular deflector plate removably and adjustably secured to the wall of the passage at its rear end and extending rearwardly into the body section, an anchor wire passing longitudinally through the head section above its axial center and having an eye at its front end for attachment to a line and having an eye at its rear end, and a hook member hingedly connected to the rear eye inside the body section and extending lengthwise thereof, said body section having spaced openings for the escape of water.

LOUIS A. NIELSEN.

REFERENCES CITED

The following references are of record in the file of this patent:

UNITED STATES PATENTS

| Number | Name | Date |
| --- | --- | --- |
| 994,927 | Jefferson | June 13, 1911 |
| 1,708,825 | Barclay | Apr. 9, 1929 |
| 1,881,947 | Rawdon | Oct. 11, 1932 |
| 1,993,018 | Pfeifle | Mar. 5, 1935 |
| 2,003,550 | Muller | June 4, 1935 |
| 2,027,069 | Sorenson | Jan. 7, 1936 |
| 2,183,816 | Lovelace | Dec. 19, 1939 |
| 2,484,744 | Roman | Oct. 11, 1949 |